United States Patent [19]

Krasnoff

[11] Patent Number: 5,053,126
[45] Date of Patent: Oct. 1, 1991

[54] APPARATUS FOR GAS LIQUID SEPARATION

[75] Inventor: Eugene Krasnoff, Princeton, N.J.

[73] Assignee: Ingersoll-Rand Company, Woodcliff Lake, N.J.

[21] Appl. No.: 486,575

[22] Filed: Feb. 28, 1990

[51] Int. Cl.$^5$ .................................... B01D 19/00
[52] U.S. Cl. .................................... 210/188; 55/204; 55/320; 55/327; 55/337; 55/461; 210/304; 210/456; 210/512.1
[58] Field of Search ............... 55/318, 320, 327, 330, 55/337, 461, 462, 204; 210/188, 304, 456, 512.1; 418/97, DIG. 1

[56] References Cited

U.S. PATENT DOCUMENTS

| | | | |
|---|---|---|---|
| 1,139,331 | 5/1915 | Boulard | 210/456 |
| 2,068,048 | 1/1937 | Adams | 210/304 |
| 2,226,045 | 12/1940 | Baldwin | 210/456 |
| 3,054,246 | 9/1962 | Jennings | 55/462 |
| 3,676,024 | 7/1972 | Akaiki et al. | 55/327 |
| 4,063,855 | 12/1977 | Paul | 418/97 |
| 4,217,118 | 8/1980 | Kopf et al. | 55/330 |
| 4,260,402 | 4/1981 | Shaffer et al. | 55/462 |
| 4,420,293 | 12/1983 | Hofmann | 418/DIG. 1 |

FOREIGN PATENT DOCUMENTS

| | | | |
|---|---|---|---|
| 85880 | 4/1977 | Australia | 55/337 |
| 229461 | 11/1985 | German Democratic Rep. | 418/DIG. 1 |
| 81/03207 | 11/1981 | World Int. Prop. O. | 418/DIG. 1 |

Primary Examiner—Robert A. Dawson
Assistant Examiner—Joseph Drodge
Attorney, Agent, or Firm—Glenn B. Foster

[57] ABSTRACT

A device for separating liquid from a mixture of the liquid and a gas includes a separator tank having an interior surface. A baffle plate in the tank defines a first higher pressure space and a second relatively lower pressure space therein. The baffle plate has first, second and third edges. The first edge is sealably connected to the interior surface. The second edge has a first portion sealably connected to the interior surface and a second portion spaced from the interior surface and defining a slot therewith. The slot has a length and a width and is the only gas passage between the first and second spaces. The third edge is spaced from the interior surface. Mixture inlet means introduces the mixture into the first space. A liquid collection reservoir is provided at one end of the tank adjacent the third edge. The slot is of such a cross-sectional area that higher pressure mixture in the first space flows through the slot and is dispersed along the entire length thereof. Liquid separated from the mixture in the first space is conducted to the collection reservoir via the space between the third edge and the interior surface such that the third edge is submerged relative to an upper surface level of the liquid reservoir. Liquid separated in the second space via the action of an internal centrifuge and gravity collects in the liquid reservoir. The liquid free gas phase discharges from the separator through a filter element.

7 Claims, 3 Drawing Sheets

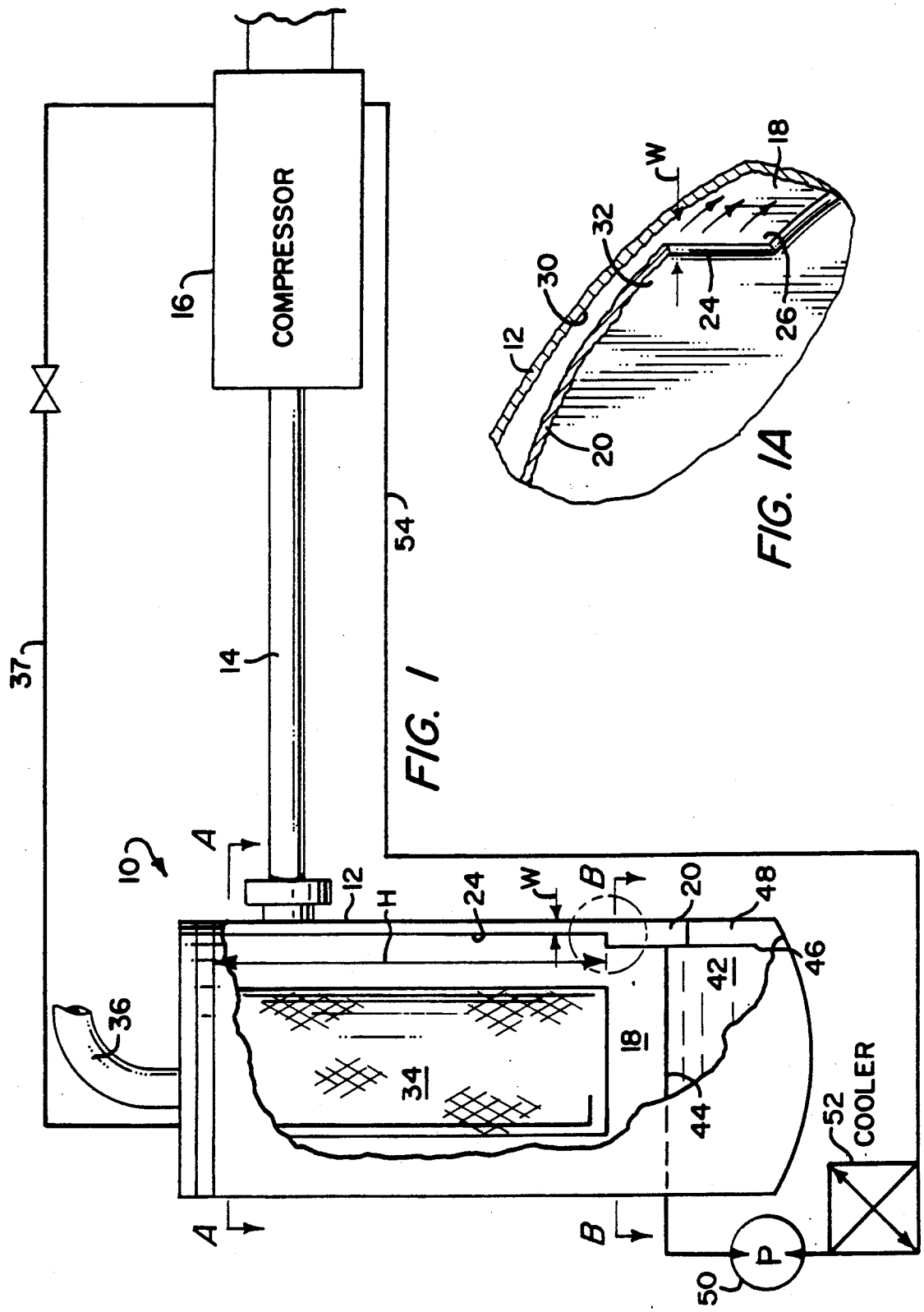

APPARATUS FOR GAS LIQUID SEPARATION

BACKGROUND OF THE INVENTION

This invention relates generally to a liquid separator for a flooded gas compressor, and particularly to an inlet gas disperser to evenly distribute gas-liquid inlet flow along the length of the separator in such a manner as to create a uniform flow pattern which is ideal for the centrifugal separation of the gas and liquid phases.

In some present compressed air - oil separators, there are a complex series of vanes which redirect the travel direction of the mixture flow in the separator. Even though the air flow loses some of its energy by the redirection, there is still considerable energy in the airflow. In these designs, the non-uniform flow field overloads the filter element with the liquid phase due to locally high velocities, resulting in inefficient separation and saturation of the filter element.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for separating liquid from a mixture of the liquid and a compressed gas comprising a separator tank having an interior surface and a filter element having a given length begin axially disposed within the separator tank. A baffle plate in the tank defines a first higher pressure space and a second relatively lower pressure fluid space therein, the baffle plate having a first and a second edge, the first edge being sealably connected to the interior surface. The second edge has a first portion sealably connected to the interior surface and a second portion being spaced from the interior surface defining a slot therewith. The slot is adjacent to, and has a height substantially equal to, said length for expelling fluid substantially radially adjacent to, said filter element substantially evenly over its length forming a gas passage between the first and second spaces. A mixture inlet introduce the mixture into the first space.

The forgoing and other aspects will become apparent from the following detailed description of the invention when considered in conjunction with the accompanying drawings. It is to be expressly understood, however, that the drawing figures are not intended as a definition of the invention, but are for the purpose of illustration only.

BRIEF DESCRIPTION OF THE DRAWING

In the drawings:

FIG. 1 is a schematic view illustrating an embodiment of the liquid separator of the instant invention, with the liquid separator partially broken away;

FIG. 1A is an enlarged perspective view of the encircled portion of FIG. 1;

DETAILED DESCRIPTION

Figure 2A:
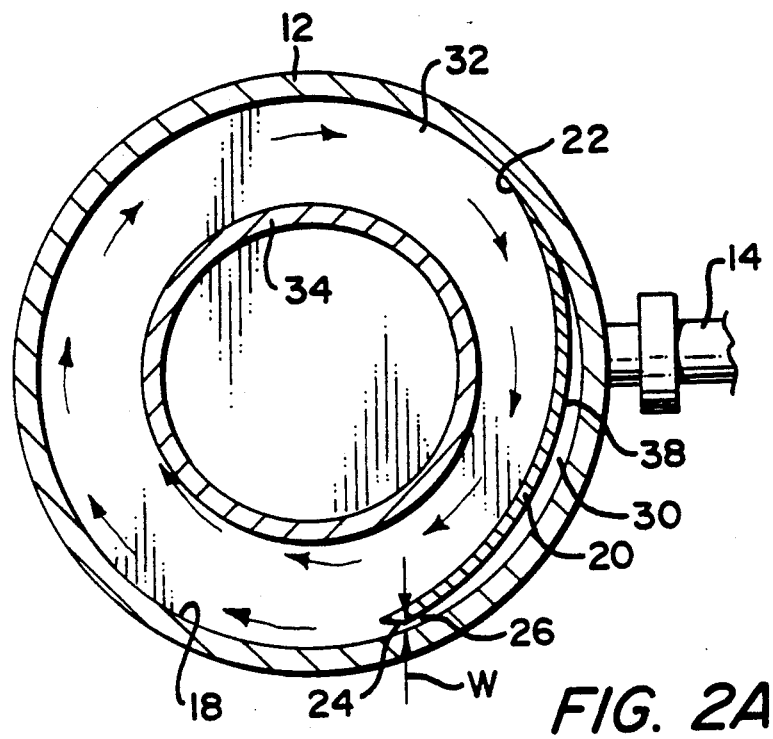
FIG. 2A is a top cross sectional view as taken through sectional lines A—A of FIG. 1.
Figure 2B:
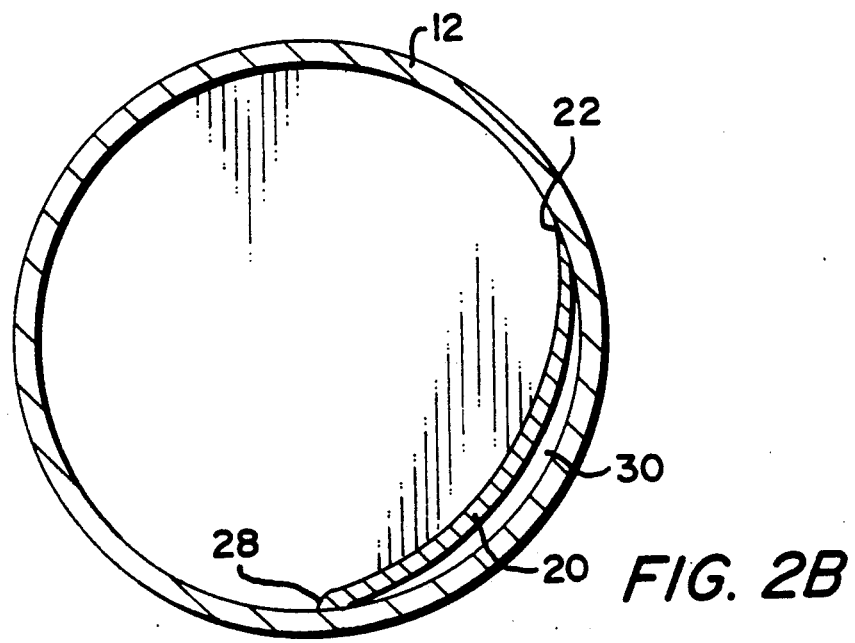
FIG. 2B is a top cross sectional view as taken through sectional lines B—B of FIG. 1.
Figure 3A:
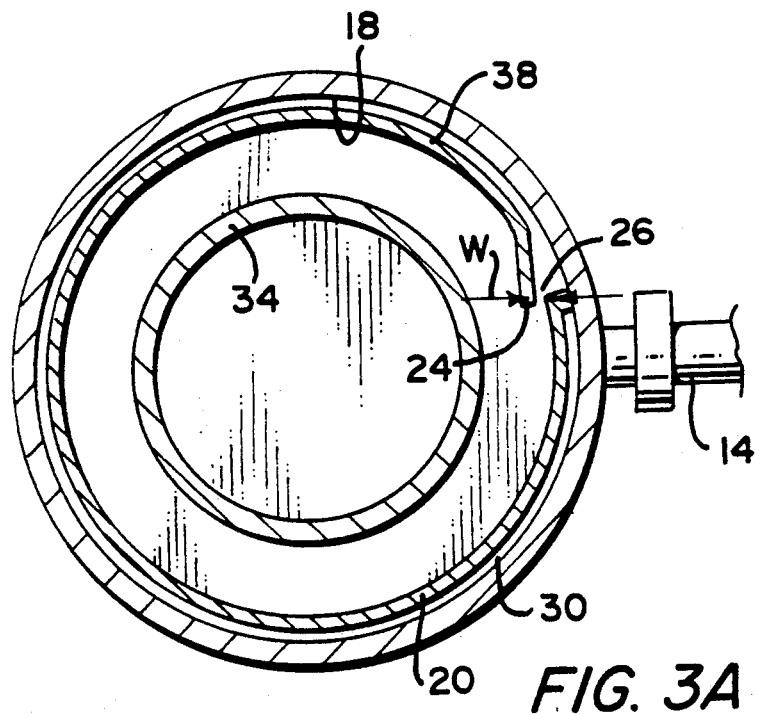
FIG. 3A is a top cross sectional view, similar to FIG. 2A, of an alternative embodiment of the instant invention.
Figure 3B:
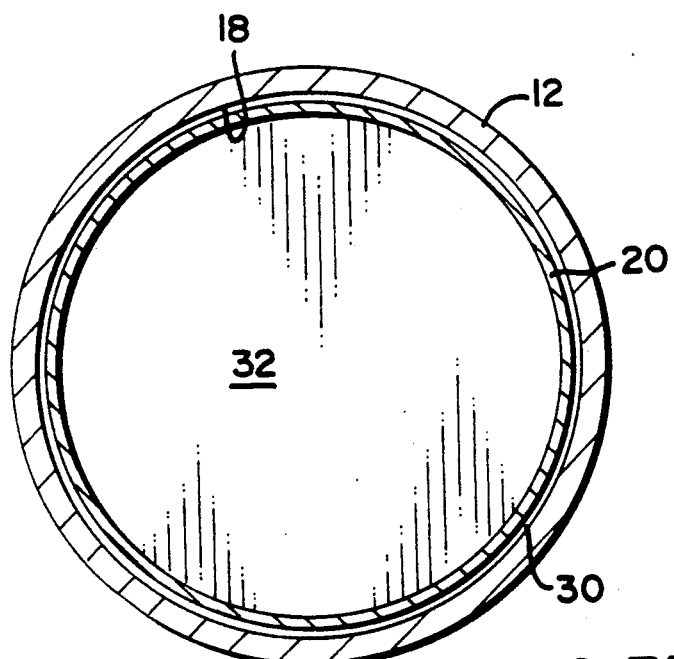
FIG. 3B is a top cross sectional view, similar to FIG. 2B, of the alternative embodiment illustrated in FIG. 3A.

A liquid separator is shown generally at 10. Even though this design is particularly applicable for separating oil from compressor exit air, it may be used to separate any liquid which is intermixed in any compressed gas.

The liquid separator 10 includes a vertically oriented separator volume 12, to which a mixture inlet 14 is connected, and supplies a mixture of gas and liquid from a compressor 16. The volume 12 has an interior cylindrical surface 18.

To separate liquid from the mixture, the reservoir 12 contains a baffle plate 20. A first edge 22 of the baffle plate is sealed to the interior surface 18 adjacent the mixture inlet 14.

A second edge 24 of the baffle plate 20 is partially spaced from the interior surface 18 to form a dispersing slot portion 26, and partially sealed to the interior wall along sealed portion 28. The configuration of the baffle plate-mixture inlet geometry, and that of the slot portion are critical to the functioning of the separator 10. The baffle plate 20 divides the separator reservoir into a first space 30 and a second space 32.

The mixture inlet 14 is placed near the top of the separator tank in such a position relative to the baffle plate 20 that the annular flow area into first space 30 adjacent to the mixture inlet is of the order of the cross sectional flow area of the mixture inlet pipe.

The dispersing slot 26 is extended over a height H which is substantially equal to the height of the separator filter element 34. Thus, the dispersing slot flow area is the product of the slot width W and its height H. This slot flow area is smaller than that of the mixture inlet 14. This slot is the only gas flow passage from the first space 30 to the second space 32.

A filter element 34 is mounted within the separation tank 12 such that any gas which has passed through the slot must pass through the element before it enters outlet 36. The filter element removes any minute airborne liquid particles not previously removed. The instant design disperses the gas flow throughout the entire filter element 34 surface instead of having the gas flow pass through the element at a few concentrated points, thus allowing efficient operation and prolonging the useful life of the filter element.

A scavenger line 37 is included to drain whatever liquid passes through the filter element 34.

A third edge 46 of the baffle plate 20 is spaced from the interior surface 18, with an aperture 48 formed therebetween. The upper liquid level 44 must be above the aperture 48 such that the draining liquid can enter the liquid collection reservoir 42, but gas passing between the first and second spaces 30, 32 can do so only through the dispersing slot 26.

A pump 50 pumps excess liquid in the liquid collection reservoir 42 back to the compressor 16, through a cooler 52 and a return line 54.

OPERATION

The separation of liquid from the mixture occurs in several sections of the separator. First, the mixture flow from the inlet 14 impinges on the surface 38 of the baffle plate 20. At this point an annular wall jet is formed on the surface 38, and the flow disperses into the first space 30. The effects of gravity and the curvature of the wall jet produce a first stage of separation in the primary chamber 30. The effect of the flow curvature produces a radially outward flow of liquid particles while gravity accelerates the liquid phase downward toward the reservoir 42.

The role of the small area dispersing slot 26 is twofold. First it provides the flow resistance which ensures the dispersal of the incoming flow throughout the first space 30. This maximizes the residence time and, therefore, the degree of separation in the first space. Second, it produces a relatively high speed and uniform circumferential flow out of the slot.

The uniform kinetic energy of this slot exit flow sets up an ideal vortex flow pattern which maximizes both the residence time in the second space 32 and the centrifugal separating forces there. That is, it produces a high strength centrifuging vortex with only small radially inward gas flow speeds which are uniform along the full length of the filter element 34. Thus, with the high centrifuging forces and the low radially inward velocities, only the most minute of the liquid particles impinge on the separator element 34. The rest migrate toward the separator wall 18 and fall into the liquid reservoir 42.

The final stage of separation takes place through the filter element itself. Since the separation of liquid from gas in spaces 30 and 32 is far more complete than in prior separators, the liquid loading of the filter element is greatly reduced.

The separation characteristics are improved in the instant invention compared to the prior art. The greatest separation improvements occur at the low pressure (high flow) uses in which these filters are most commonly used.

Large improvements were also noted with the instant invention during transients such when the compressors were initially started, as there is a large volume of liquid which passes through the prior separators during this period. With the instant invention, there is an order of magnitude more complete liquid separation, resulting in a elimination of the usual liquid carry-over.

While this invention has been illustrated and described in accordance with a preferred embodiment, it is recognized that variations and changes may be made therein without departing from the invention as set forth in the claims.

What is claimed is:

1. An apparatus for separating liquid from a mixture of the liquid and a compressed gas comprising:
    a separator tank having an interior surface;
    a filter element having a given length axially disposed within the separator tank;
    a baffle plate in the tank defining a first higher pressure space and a second relatively lower pressure fluid space therein, the baffle plate having first, second and third edges, the first edge sealably connected to the interior surface, the second edge having a first portion sealably connected to the interior surface and a second portion being spaced from the interior surface defining a slot therewith, the slot being adjacent to, and having a height substantially equal to, said length for expelling fluid substantially radially adjacent to said filter element substantially evenly over its length, wherein a gas passage is formed between the first and second spaces, and the third edge being separated from the slot by the first portion of the second edge, the third edge also being spaced from the interior surface;
    mixture inlet means for introducing the mixture into the first space; and
    a liquid collection reservoir at one end of the tank adjacent the third edge, whereby the slot is of such a cross sectional area that the higher pressure mixture in the first space flows through the slot and is dispersed along the entire length thereof, and liquid separated from the mixture is conducted to the collection reservoir via the space between the third edge and the interior surface such that the third edge is submerged relative to an upper surface level of the liquid reservoir.

2. The apparatus as described in claim 1, wherein the height of the slot extends perpendicular to the third edge.

3. The apparatus as described in claim 1, wherein the tank is cylindrical in cross section.

4. The apparatus as described in claim 1, wherein mixture passing through the slot initially orbits the filter element.

5. The apparatus as described in claim 1, wherein the slot is above the upper surface level of the liquid in the liquid reservoir.

6. The apparatus as described in claim 1, wherein the second space defined a centrifugal separator.

7. The apparatus as described in claim 6, wherein liquid separated int eh second space collects in the liquid reservoir.

* * * * *